US012776118B2

(12) United States Patent
Hou et al.

(10) Patent No.: US 12,776,118 B2
(45) Date of Patent: Oct. 27, 2026

(54) HIGH-DEFINITION VIDEO SEGMENTATION FOR WEB-BASED VIDEO CONFERENCING

(71) Applicant: Google LLC, Mountain View, CA (US)

(72) Inventors: Tingbo Hou, Santa Clara, CA (US); Matthias Grundmann, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 66 days.

(21) Appl. No.: 18/728,018

(22) PCT Filed: Oct. 24, 2022

(86) PCT No.: PCT/US2022/047540
§ 371 (c)(1),
(2) Date: Jul. 10, 2024

(87) PCT Pub. No.: WO2023/163757
PCT Pub. Date: Aug. 31, 2023

(65) Prior Publication Data

US 2025/0232556 A1 Jul. 17, 2025

Related U.S. Application Data

(60) Provisional application No. 63/314,530, filed on Feb. 28, 2022.

(51) Int. Cl.

*G06V 10/26* (2022.01)
*G06T 11/00* (2026.01)
*G06V 10/70* (2022.01)
*G06V 20/40* (2022.01)
*G06V 40/10* (2022.01)

(52) U.S. Cl.
CPC .............. *G06V 10/26* (2022.01); *G06T 11/00* (2013.01); *G06V 10/70* (2022.01); *G06V 20/40* (2022.01); *G06V 40/10* (2022.01)

(58) Field of Classification Search
None
See application file for complete search history.

(56) References Cited

U.S. PATENT DOCUMENTS

2019/0130229 A1* 5/2019 Lu .......................... G06V 10/82
2020/0098161 A1* 3/2020 Smith .................... G06Q 10/40
(Continued)

OTHER PUBLICATIONS

International Preliminary Report on Patentability for Application No. PCT/US2022/047540, mailed Sep. 12, 2024, 9 pages.
(Continued)

*Primary Examiner* — Nurun Flora
(74) *Attorney, Agent, or Firm* — DORITY & MANNING, P.A.

(57) ABSTRACT

Systems and methods for image segmentation can include downloading a machine-learned image segmentation model to be utilized while in the web browser. For example, a user can access a web service, which can initiate the download of a software package including the machine-learned image segmentation model. The image segmentation model can then be utilized for segmenting image data obtained with a user computing device.

19 Claims, 13 Drawing Sheets

(56) References Cited

U.S. PATENT DOCUMENTS

2020/0327334 A1* 10/2020 Goren .................... G06V 20/40
2022/0237735 A1* 7/2022 Zingade ................ G06T 3/4038

OTHER PUBLICATIONS

Ryu et al., "Performance Analysis of Applying Deep Learning for Virtual Background of WebRTC-based Video Conferencing System", 22nd Asia Pacific Network Operations and Management Symposium, 2021, 4 pages.
Cao et al., "Rapid Detection of Blind Roads and Crosswalks by Using a Lightweight Semantic Segmentation Network", Institute of Electrical and Electronics Engineers Transactions on Intelligent Transportation Systems, vol. 22, Issue 10, Oct. 2021, pp. 6188-6197.
Cheng et al., "Boundary IoU: Improving Object-Centric Image Segmentation Evaluation", arXiv:2103.16562v1, Mar. 30, 2021, 13 pages.
Google Research, "Background Features in Google Meet, Powered by Web ML", Oct. 30, 2020, https://research.google/blog/background-features-in-google-meet-powered-by-web-ml/, retrieved on Aug. 29, 2024, 8 pages.
Howard et al., "Searching for MobileNetV3", arXiv:1905.02244v5, Nov. 20, 2019, 11 pages.
Huynh et al., "Eye Semantic Segmentation with a Lightweight Model", arXiv:1911.01049v1, Nov. 4, 2019, 4 pages.
International Search Report and Written Opinion for PCT/US2022/047540, mailed on Feb. 7, 2023, 16 pages.
Sandler et al., "MobileNetV2: Inverted Residuals and Linear Bottlenecks", arXiv:1801.04381v4, Mar. 21, 2019, 14 pages.
Seo et al., "Towards Real-Time Automatic Portrait Matting on Mobile Devices", arXiv:1904.03816v1, Apr. 8, 2019, 11 pages.
Shanmugamani, "Semantic Segmentation", Deep Learning for Computer Vision: Expert Techniques to Train Advanced Neural Networks Using TensorFlow and Keras, Packt Publishing, 2018, 28 pages.
Tan et al., "EfficientNet: Rethinking Model Scaling for Convolutional Neural Networks", arXiv:1905.11946v5, Sep. 11, 2020, 11 pages.
Ye et al., "BSDNet: Balanced Sample Distribution Network for Real-Time Semantic Segmentation of Road Scenes", Institute of Electrical and Electronics Engineers Access, vol. 9, Jun. 16, 2021, 11 pages.

* cited by examiner

HIGH-DEFINITION VIDEO SEGMENTATION FOR WEB-BASED VIDEO CONFERENCING

RELATED APPLICATIONS

This application is based on and claims priority under 35 U.S.C. § 371 to International Application No. PCT/US2022/047540 filed on Oct. 24, 2022, which claims priority to and the benefit of U.S. Provisional Patent Application No. 63/314,530, filed Feb. 28, 2022. International Application No. PCT/US2022/047540 and U.S. Provisional Patent Application No. 63/314,530 are hereby incorporated by reference in their entirety.

FIELD

The present disclosure relates generally to image segmentation for video conferencing. More particularly, the present disclosure relates to high-definition video segmentation for web-based video conferencing.

BACKGROUND

Various interconnected computer systems such as, for example, the World Wide Web (the "web") can provide a widely-accessible platform for various interactions or operations. For example, the web can allow users to access platforms without needing to install additional packages or applications. One example platform can include a video conferencing service for connecting users over the internet. Modern video conferencing products can have web clients that may access the platform via a web browser.

Segmentation can be a fundamental problem in computer vision, with many applications (e.g., virtual background in video conferencing). Running real-time segmentation in a web browser can be a challenging problem. Additionally, in some existing systems, the segmentation can be of low quality segmenting and produce low quality images.

SUMMARY

Aspects and advantages of embodiments of the present disclosure will be set forth in part in the following description, or can be learned from the description, or can be learned through practice of the embodiments.

One example aspect of the present disclosure is directed to a computing system for web-based video segmentation. The system can include one or more processors and one or more non-transitory computer-readable media that collectively store instructions that, when executed by the one or more processors, cause the computing system to perform operations. The operations can include obtaining image data from a user computing device. In some implementations, the image data can include an object. The operations can include implementing, by one or more processors of the user computing device, a video conferencing web application. Implementing the video conferencing web application can include: processing, by the one or more processors of the user computing device, the image data with a machine-learned image segmentation model to generate segmentation data: generating augmented image data based at least in part on the segmentation data; and providing the augmented image data for display.

In some implementations, the operations can include transmitting a request to utilize an image augmentation service associated with the video conferencing web application and obtaining a software package from a server computing system based on the request. The software package can include the machine-learned image segmentation model. The image data can include a video associated with a video conference call. Each frame of the video can be processed by the machine-learned image segmentation model to generate a plurality of segmentation masks. The augmented image data can include an augmented video generated based on the plurality of segmentation masks.

In some implementations, the operations can include sending the augmented image data to a second user computing device associated with a second user. The segmentation data can include a segmentation mask associated with the object. In some implementations, the segmentation mask can be descriptive of a plurality of pixels associated with a human. The object can include a human. The augmented image data can be descriptive of the object with an artificial background. In some implementations, the image data can be captured by a webcam associated with the user computing device. The object can include at least a portion of a human. In some implementations, the image data can be obtained as part of a video conference service provided by the video conferencing web application. The video conference service can include sending the augmented image data to a second user computing device, receiving second user image data from the second user computing device, and providing the second user image data for display.

Another example aspect of the present disclosure is directed to a computer-implemented method for web-based video segmentation. The method can include transmitting, by a user computing system including one or more processors, an augmentation request to a server computing system. In some implementations, the augmentation request can be associated with a web application. The method can include obtaining, by the user computing system, a software package from the server computing system. In some implementations, the software package can include a machine-learned image segmentation model. The method can include obtaining, by the user computing system, image data. The image data can include an object. The method can include processing, by the user computing system, the image data with the machine-learned image segmentation model to generate segmentation data and generating, by the user computing system, augmented image data based at least in part on the segmentation data. In some implementations, the method can include providing, by the user computing system, the augmented image data for display.

In some implementations, processing, by the user computing system, the image data with the machine-learned image segmentation model to generate the segmentation data can include processing utilizing a graphics processing unit of a user computing device of the user computing system. Processing, by the user computing system, the image data with the machine-learned image segmentation model to generate the segmentation data can include accessing the one or more processors via a web browser application programming interface. In some implementations, the method can include storing, by the user computing system, the software package: accessing, by the user computing system, a web page associated with the web application: obtaining, by the user computing system, additional image data: processing, by the user computing system, the additional image data with the machine-learned image segmentation model to generate additional segmentation data; and generating, by the user computing system, additional augmented image data based at least in part on the additional segmentation data.

Another example aspect of the present disclosure is directed to one or more non-transitory computer-readable media that collectively store instructions that, when executed by one or more computing devices, cause the one or more computing devices to perform operations. The operations can include obtaining input data. In some implementations, the input data can include image data associated with a user, and the image data can include an object in a scene. The operations can include processing the input data with a machine-learned image segmentation model to generate segmentation data. The machine-learned image segmentation model can include one or more encoder blocks. The one or more encoder blocks can be configured to process the image data to generate an encoder output, and the one or more encoder blocks can include a channel expansion block, a depthwise convolution block, and a channel compression block. In some implementations, the machine-learned image segmentation model can include one or more bottleneck blocks. The one or more bottleneck blocks can be configured to process the encoder output to generate a bottleneck output. The machine-learned image segmentation model can include one or more decoder blocks. In some implementations, the one or more decoder blocks can be configured to process the bottleneck output to generate the segmentation data. The operations can include generating output data based on the segmentation data in response to processing the input data with the machine-learned image segmentation model. The output data can include augmented image data, and the augmented image data can be descriptive of the object without the scene.

In some implementations, the one or more bottleneck blocks can include a global pooling block configured to process the encoder output generated by the one or more encoder blocks to generate a pooling output, a convolution block configured to process the encoder output generated by the one or more encoder blocks to generate a convolution output, and a bottleneck concatenation block configured to concatenate the pooling output and the convolution output. The one or more bottleneck blocks can include channel-wise attention. In some implementations, the one or more decoder blocks can include one or more multi-layer perceptron blocks. The one or more decoder blocks can include an upsample block configured to upsample a coarse prediction output by the bottleneck block to generate an upsampled output and a decoder concatenation block configured to concatenate the upsampled output and a fine feature provided via a skip connection from the one or more encoder blocks. In some implementations, the machine-learned image segmentation model can be stored in a server computing system communicatively connected to one or more user computing devices.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
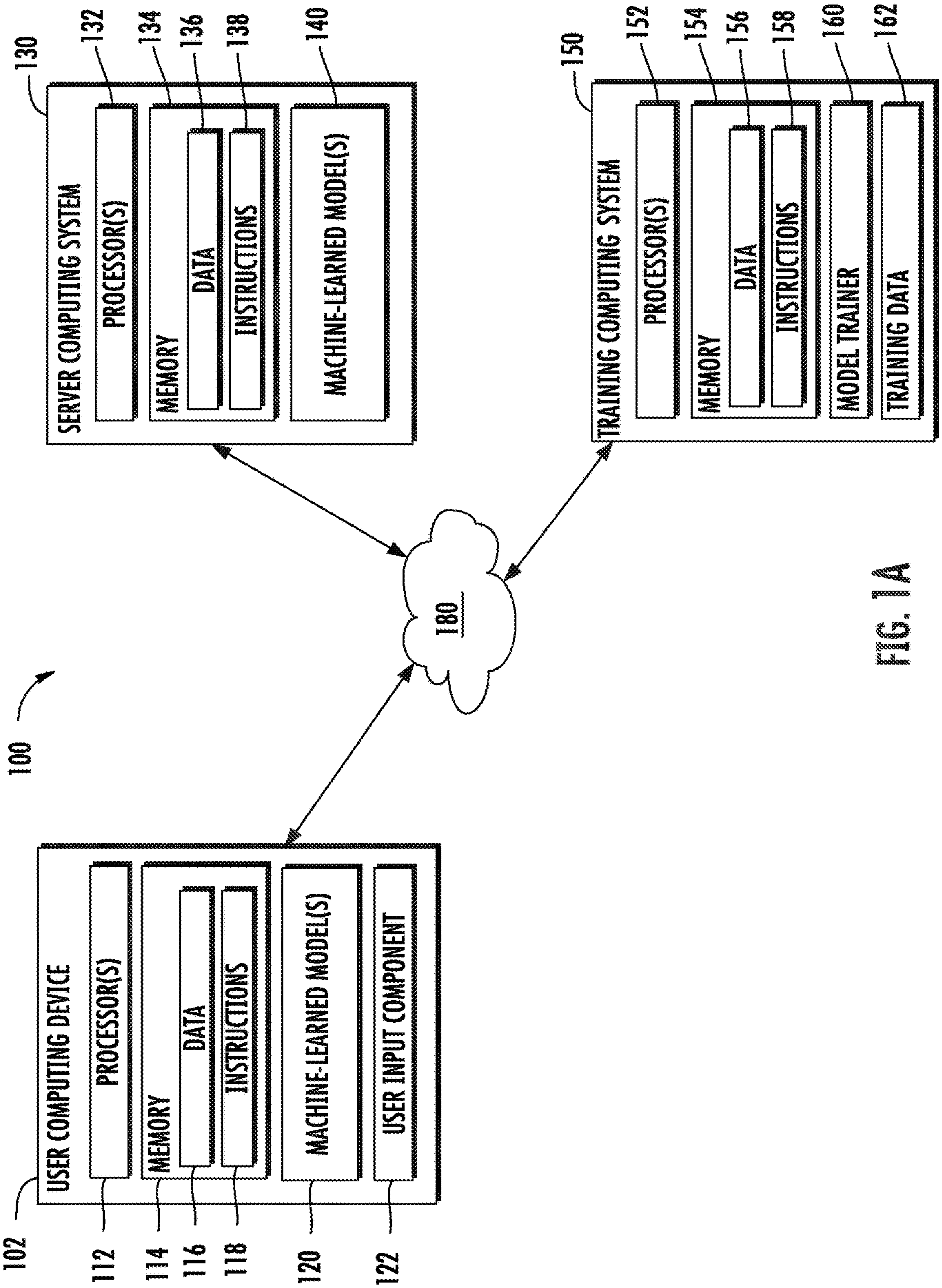
FIG. 1A depicts a block diagram of an example computing system that performs image segmenting according to example embodiments of the present disclosure.

Reference numerals that are repeated across plural figures are intended to identify the same features in various implementations.

DETAILED DESCRIPTION

Overview

Generally, the present disclosure is directed to image segmentation with an image segmentation model for web-based video conferencing. More specifically, the systems and methods can leverage a light-weight segmentation model (e.g., a segmentation model based on MobileNetV3 (Howard et al., "Searching for MobileNetV3," Google AI & Google Brain (Nov. 20, 2019), https://arxiv.org/pdf/1905.02244.pdf.)) for segmenting image data before transmittance to another user. In some implementations, the image segmentation model may be designed for CPU inference (e.g., CPU inference on a user computing device). Alternatively and/or additionally, the systems and methods disclosed herein can leverage the high performance computing of a GPU for the model inference. The GPU may be accessible via a web browser application (e.g., a web browser supporting WebGL ("WebGL," KHRONOS GROUP (last visited Feb. 21, 2022), https://www.khronos.org/webgl/.) or WebGPU (Malyshau et al., "WebGPU: W3C Working Draft," W3 (Feb. 18, 2022), https:// www.w3.org/TR/webgpu/.)). Therefore, the systems and methods disclosed herein can include a high-definition image segmentation model leveraging GPU inference in web browsers. The image segmentation model can run in real-time for computers (e.g., laptops), which can provide better user experience in video conferencing.

The systems and methods for image segmentation can include obtaining image data from a user computing device. In some implementations, the image data can include an object. The systems and methods can include implementing a video conferencing web application. In some implementations, the video conferencing web application can be implemented by one or more processors of the user computing device (e.g., the video conferencing web application may run on one or more processors of the user computing device). Implementing the video conferencing web application can include processing, by one or more processors of the user computing device, the image data with a machine-learned image segmentation model to generate segmentation data. The segmentation data can include one or more segmentation masks associated with the object. Augmented image data can then be generated based at least in part on the segmentation data. The augmented image data can be descriptive of the object in a different environment. Alternatively and/or additionally, the augmented image data may be descriptive of the original environment from the image data without the object. The augmented image data can then be provided as output. In some implementations, the augmented image data may be provided for display.

The systems and methods can obtain input data (e.g., image data). The input data can be obtained from a user computing device with a CPU and a GPU for processing. In some implementations, the input data can include image data descriptive of one or more image frames. The image data can include an object (e.g., a human, a dog, a product, or a structure). In some implementations, the image data can be captured by a webcam associated with the user computing device.

Additionally and/or alternatively, the image data can be obtained as part of a video conference service (e.g., a video conference service provided via a video conferencing web application). For example, the image data can include a plurality of image frames associated with a video stream. In some implementations, the object can include at least a portion of a human. For example, the object can include a user's head and a portion of their torso. In some implementations, the video conferencing service can include sending the augmented image data to a second user computing device, receiving second user image data from the second user computing device, and providing the second user image data for display.

The input data (e.g., the image data) can be processed with a machine-learned image segmentation model to generate segmentation data. In some implementations, the systems and methods can include implementing a video conferencing web application. The video conferencing web application can be implemented by one or more processors of the user computing device (e.g., the video conferencing web application may run on one or more processors of the user computing device). In some implementations, the processing of the input data with the machine-learned image segmentation model can be a result of the implementation of the video conferencing web application. The processing can occur using one or more processors of the user computing device. In some implementations, the segmentation data can include a segmentation mask associated with the object. For example, the segmentation data can be descriptive of a segmentation mask masking the object. The segmentation mask can be descriptive of a plurality of pixels associated with a human.

In some implementations, the segmentation task can be a foreground/background segmentation. For example, the segmentation data can include an output segmentation mask of the foreground. Alternatively and/or additionally, the segmentation data may include an output segmentation mask of the background.

To achieve immersive rendering with a virtual background, the segmentation mask may be of a high definition. Due to the network bandwidth, the resolution of sessions in video conferencing can usually be capped at 720P (height: 720, width: 1280). In some implementations, the image segmentation model may be designed to have a high resolution relative to the video streams. The model input can be a tensor with size [288, 512, 3] of HWC, and the output may be a segmentation mask with the same resolution. In some implementations, the machine-learned image segmentation model may include a U-Net structure to design the segmentation model for performing simple and efficiently and for the output to be refined to a high resolution, relative to the input.

In some implementations, the augmented image data can be generated based at least in part on the segmentation data. The augmented image data can be descriptive of the object with an artificial background.

The augmented image data can be provided for display. The augmented image data can be provided for display on the user computing device. Additionally and/or alternatively, the augmented image data can be provided on a third party computing device separate from the user computing device and the server computing device. In some implementations, the augmented image data may be sent directly to the third party computing device from the user computing device over a network. For example, the systems and methods can include sending the augmented image data to a second user computing device associated with a second user. In some implementations, the augmented image data may be provided in a user interface of a video conferencing web service.

In some implementations, the image data can include a video. Each frame of the video can be processed by the machine-learned segmentation model to generate a plurality of segmentation masks, and the augmented image data can include an augmented video generated based on the plurality of segmentation masks.

In some implementations, the systems and methods can include transmitting a request to utilize an image augmentation service and obtaining a software package from a server computing system based on the request. The software package can include the machine-learned image segmentation model. In some implementations, the image augmentation service may be associated with the video conferencing web application.

For example, the systems and methods can include systems and methods for web-based video segmentation. In some implementations, the systems and methods can include transmitting an augmentation request to a server computing system. In some implementations, the augmentation request can be associated with a web application. In response, a software package can be obtained. The software package may be obtained from a server computing system associated with the web application. In some implementations, the software package can include a machine-learned image segmentation model.

The systems and methods can obtain image data. The image data can be obtained with a camera connected to a user computing device. In some implementations, the image data can include an object. The object can be an animal, a product (e.g., a product being advertised), a structure, a plant, or an object in nature. In some implementations, the image data can include a plurality of objects for segmenting.

The image data can be processed with the machine-learned image segmentation model to generate segmentation data. The segmentation data can include one or more segmentation masks associated with the one or more objects. In some implementations, processing the image data with the machine-learned image segmentation model to generate the segmentation data can include processing utilizing the graphics processing unit of a user computing device of the user computing system. Alternatively and/or additionally, processing the image data with the machine-learned image segmentation model to generate the segmentation data can include accessing the one or more processors via a web browser (e.g., via a web browser application programming interface).

In some implementations, the augmented image data can be generated based at least in part on the segmentation data. The augmented image data can include the object in an environment different from an original environment depicted in the image data. For example, the augmented image data may be descriptive of the object with a virtual background.

The augmented image data can be provided for display. In some implementations, the augmented image data may be provided on the user computing device. Alternatively and/or additionally, the augmented image data may be provided for display on a third party computing device in response to the user computing device transmitting the augmented image data to the third party computing device.

In some implementations, the software package can be stored by the user computing system for future instances of video conferencing. The software package may be stored in connection with the user's preferred web browser application. In some implementations, the storage of the software package can involve encryption of the software package.

In some implementations, the systems and methods can include accessing a web page associated with the web application. The web page can be accessed via an internet connection. The web page may be provided for display in a web browser application.

Additional image data can then be obtained. The additional image data can be obtained with a webcam associated with the user computing system. The image data can include the same object as the original object and/or may include a second object different from the original object.

The additional image data can then be processed with the machine-learned image segmentation model to generate additional segmentation data. The additional image data can be processed with one or more processors associated with the user computing system. The additional segmentation data can include one or more additional segmentation masks associated with one or more objects in the additional image data.

Additional augmented image data can be generated based at least in part on the additional segmentation data. The additional augmented image data can include the one or more objects from the additional image data in a new environment, or scene.

The systems and methods disclosed herein can involve processing with an image segmentation model that includes a plurality of blocks (e.g., an encoder block, a bottleneck block, and/or a decoder block). For example, the systems and methods can include obtaining input data. In some implementations, the input data can include image data associated with a user. The image data can include an object in a scene. In some implementations, the object can include at least a portion of the human body, and the scene can include a room that the human may be sitting or standing in during image capture. For example, the image data can include data captured by a webcam during a video conference. The input data can be processed with a machine-learned image segmentation model to generate segmentation data. The segmentation data can include one or more segmentation masks associated with at least one of the object or the scene. In some implementations, the machine-learned image segmentation model can include one or more encoder blocks, one or more bottleneck blocks, and/or one or more decoder blocks. In response to processing the input data with the machine-learned image segmentation model, the systems and methods can generate output data based on the segmentation data. The output data can include augmented image data. In some implementations, the augmented image data can be descriptive of the object without the scene.

In some implementations, the systems and methods can include obtaining input data. The input data can include image data associated with a user. The image data can include an object (e.g., a human, another animal, a building, a furniture item, an electronic device, a sign, a poster, a vehicle, etc.) in a scene (e.g., a room, a park, a road, an alley, etc.).

The input data (e.g., the image data) can be processed with a machine-learned image segmentation model to generate segmentation data. The machine-learned image segmentation model may be obtained from a server computing system. The machine-learned image segmentation model may be downloaded in response to the user computing device accessing a video conferencing web service.

In some implementations, the machine-learned image segmentation model can be stored in a server computing system communicatively connected to one or more user computing devices. The one or more user computing devices can include a first user computing device associated with the input data and a second user computing device associated with a third party user. The first user computing device and the second user computing device can be communicatively connected via the video conferencing web service.

The machine-learned image segmentation model can include one or more encoder blocks, one or more bottleneck blocks, and one or more decoder blocks. In some implementations, the machine-learned image segmentation model can include a MobileNetV3 model. Alternatively and/or additionally, the machine-learned image segmentation model can include a U-Net structure.

The one or more encoder blocks can include a channel expansion block, a depthwise convolution block, and a channel compression block. The channel expansion block can be configured to process the input data to generate a channel expansion output. The depthwise convolution block can be configured to process the channel expansion output to generate a depthwise convolution output. Additionally and/or alternatively, the channel compression block can be configured to process the depthwise convolution output to generate an encoder output.

The systems and methods disclosed herein can include on-device machine-learned models, which can rely on efficient units with low latency and low power consumption. Examples of on-device convolutional neural networks (CNNs) can include MobileNets and EfficientNets. Both convolutional neural networks can utilize depthwise separable 2D convolutions, following channel expansion to avoid information loss. Additionally and/or alternatively, MobileNetV3 can add a squeeze-and-excite mechanism for channel-wise attention. The operation can be very effective for feature selection and can be efficient for CPU computing. However, the global pooling used to extract channel-wise attention may not be efficient for GPU computing. Therefore, EfficientNets can be utilized to scale up MobileNets with different widths, depths, and image sizes. Moreover, EfficientNet-Lite can remove the squeeze-and-excite, which can be supported by some on-device accelerators.

The encoder blocks (e.g., one or more encoder models) can extract features at five levels: ½, ¼, ⅛, 1/16, and 1/32 of the input resolution. The systems and methods can reuse the inverted residual block to design the encoder. In each encoder level, the encoder can include one or two inverted residual blocks. Additionally and/or alternatively, the input tensor may be expanded in channel, passed to a depthwise convolution, and then compressed to the original channel size. Depending on the hardware, the depthwise convolution may be replaced by group convolution. To save packet size, on-device models may use f16 format. In some implementations, the systems and methods can use ReLu6 for the activation function, since ReLu6 can preserve accuracy when converting models from f32 to f16.

The residual connection may be skipped if the depthwise convolution has a stride for downscaling the tensor.

The one or more bottleneck blocks can include a global pooling block, a convolution block, and a bottleneck concatenation block. In some implementations, the global pooling block can be configured to process an encoder output generated by the one or more encoder blocks to generate a pooling output. The convolution block can be configured to process the encoder output generated by the one or more encoder blocks to generate a convolution output. The bottleneck concatenation block can be configured to concatenate the pooling output and the convolution output. In some implementations, the one or more bottleneck blocks can include channel-wise attention.

The bottleneck model, which can include one or more bottleneck blocks, can output coarse predictions at 1/32 of the input resolution. The bottleneck blocks can multiply a channel-wise attention to the prediction, obtained by a global average pooling with sigmoid activation. The prediction can then be refined by the decoder with skip connections of features from the encoder.

In some implementations, the one or more decoder blocks can include an upsample block and a decoder concatenation block. The upsample block can be configured to upsample a coarse prediction output by the bottleneck block to generate an upsampled output. The decoder concatenation block can be configured to concatenate the upsampled output and a fine feature provided via a skip connection from the one or more encoder blocks. In some implementations, the one or more decoder blocks can include one or more multi-layer perceptron blocks.

The systems and methods can include a decoder model designed by using the multilayer perceptron (MLP). A coarse prediction can be upsampled and concatenated with a fine feature connected through a skip connection from the encoder. The prediction can be refined at pixel level by one or more MLP layers implemented by 1×1 convolutions and ReLu6 activations.

In some implementations, the decoder model can include four levels of MLP blocks, which can progressively upsample the prediction to ½ of the input resolution. The final prediction can predict at ½ of input resolution, predict at the full resolution by upsampling and a convolution, and predict at the full resolution by a transposed convolution. Additionally and/or alternatively, the systems and methods can use a transposed convolution as the final output layer.

In some implementations, prediction may occur solely at the full resolution by a transposed convolution.

In response to processing the input data with the machine-learned image segmentation model, the systems and methods can include generating output data based on the segmentation data. In some implementations, the output data can include augmented image data. The augmented image data can be descriptive of the object (e.g., the human, the plant, the building, or a product) without the scene (e.g., the room, the road, the alley, etc.).

| Model | Resolution | FLOP | Latency | IOU | Boundary IOU |
|---|---|---|---|---|---|
| Large Model | [144, 256] | 64M | 4.3 ms | 0.947 | 0.613 |
| Example Model | [288, 512] | 850M | 9.7 ms | 0.977 | 0.786 |

As depicted in the table above, an example image segmentation model, as disclosed herein, can be compared with a larger model. Equipped with a large capacity (13× FLOPs), the example image segmentation model can archive at a significantly higher quality, measured by intersection-over-union (IOU) and boundary IOU.

The two models can be benchmarked with an inference backend based on WebGL. The benchmark can be conducted on a MacBook Pro 2018 with an integrated GPU (Intel UHD 630, 1.5 GB memory) and a dedicated GPU (RADEON Pro 555X, 4 GB memory). The latency of the example HD image segmentation model can be 9.7 ms, which can be sufficient for real-time applications in video conferencing.

An image segmentation model disclosed herein can be able to segment fine details (e.g., details of hands and headphones). In some implementations, the image segmentation model can improve the virtual background feature in web-based video conferencing. Compared with the in-app video conferencing solutions, which can access on-device GPU resources at native level, the web HD segmentation disclosed herein can run smoothly with real-time performance and can achieve the best visual quality with fine contours of the foreground.

In some implementations, the systems and methods disclosed herein can include an HD image segmentation model tailored for web-based applications (e.g., virtual background in video conferencing). The systems and methods can provide a higher quality, compared with the products available on the market, which can include in-app solutions. In some implementations, the image segmentation model can be designed with efficient components that can run in real time on devices with GPUs. Leveraging GPU inference via WebGL or WebGPU, the image segmentation model can be equipped with a large capacity, resulting in a better user experience for the applications.

The systems and methods disclosed herein can be leveraged for video conference virtual backgrounds. For example, a user may be participating in a video conference call but may desire not to show their background environment (e.g., their room). The systems and methods disclosed herein can be utilized to segment the user from their background and replace their background with a virtual background. The virtual background can be a background provided by the video conference web service or may be a background selected by the user from their own personal collection or database.

In some implementations, the user can access a video conference web service (e.g., via a user computing device communicatively connected to a network for accessing the web service (e.g., a web service provided via a web application)) to begin a video conference session (e.g., a video conference call with one or more other users). The user can then send a request (e.g., a request sent in response to a user selection of a user interface element associated with a virtual background feature) to utilize a virtual background feature of the video conference web service (e.g., a video conference web service accessed via a web browser).

In response to the request, the web service (e.g., a web service provided by a video conferencing web application) can instruct the user computing device to download a lightweight software package. The software package can include a machine-learned image segmentation model along with instructions for segmentation. In some implementations, the software package can include one or more template virtual backgrounds to use for adding an artificial background to the user's video stream. Additionally and/or alternatively, the software package can include instructions for segmenting an object, blurring the background and adding the blurred background back into the image data to generate augmented image data with a blurred background and an untouched object.

In some implementations, the user computing device can then utilize the software package to process obtained image data to generate augmented image data. The obtained image data can include the user in an environment (e.g., an office, a bedroom, a restaurant, etc.), and the augmented image data can be descriptive of the user in an artificial environment (e.g., a virtual background environment, which can include an office space, the beach, space, the original environment but blurred, or cartoon world).

Processing the obtained image data to generate augmented image data can include processing the image data with the machine-learned image segmentation model to generate segmentation data. The segmentation data can include one or more segmentation masks associated with a silhouette of a user. The user can then be superimposed on a virtual background based on the segmentation data. Alternatively and/or additionally virtual background data and the segmentation data may be concatenated in such a way to generate the augmented image data.

The augmented image data can then be provided as an upload for the video conference session such that the user is displayed with a virtual background in place of their real world background.

In some implementations, the systems and methods disclosed herein can be applied to audio segmentation and augmentation in order to provide web-based audio correction or synthesizing. For example, an audio segmentation model can be downloaded and utilized to remove or mitigate unwanted audio noise. In some implementations, the audio segmentation model may be utilized to remove certain words that may be undesirable for the web application currently in use. The audio segmentation model can be trained to classify the unwanted noise and/or unwanted terms and remove them from the input audio data.

In some implementations, the systems and methods for image segmentation can include obtaining image data from a user computing device. In some implementations, the image data can include an object. The systems and methods can include processing, using one or more processors of the user computing device and based on instruction provided by a server computing system, the image data with a machine-learned image segmentation model to generate segmentation data. The segmentation data can include one or more segmentation masks associated with the object. Augmented image data can then be generated based at least in part on the segmentation data. The augmented image data can be descriptive of the object in a different environment. Alternatively and/or additionally, the augmented image data may be descriptive of the original environment from the image data without the object. The augmented image data can then be provided for display.

The systems and methods of the present disclosure provide a number of technical effects and benefits. As one example, the system and methods can provide a machine-learned image segmentation model for video segmentation for web-based video conferencing. More specifically, the systems and methods disclosed herein can leverage GPU inferencing in web browsers and web-based application programming interfaces. For example, the user can access a web service for video conferencing. In response to accessing the web service, a software package including an image segmentation model can be automatically downloaded. Image segmentation can then be coordinated inside the web browser using a user computing device.

Another technical benefit of the systems and methods of the present disclosure is the ability to complete video segmentation for web-based video conferencing without requiring the download of a separate conferencing application. In particular, the downloaded software package can be limited to only the resources needed for the virtual background feature. Therefore, the image segmentation can be completed on the user computing device to maximize the image quality of the augmented image before transmitting the augmented image.

Another example technical effect and benefit relates to the reduction of computational cost and computational time. The systems and methods disclosed herein can limit the transmittal and download of software to just the features needed to enable the high quality video segmentation. The augmented image can then be transmitted directly to the intended recipient without having to transmit to a server computing system for augmentation.

With reference now to the Figures, example embodiments of the present disclosure will be discussed in further detail.

Example Devices and Systems

FIG. 1A depicts a block diagram of an example computing system 100 that performs image segmentation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more image segmentation models 120. For example, the image segmentation models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example image segmentation models 120 are discussed with reference to FIGS. 2-5 & 9-10.

In some implementations, the one or more image segmentation models 120 can be received from the server computing system 130 over network 180, stored in the user computing device memory 114, and then used or otherwise implemented by the one or more processors 112. In some implementations, the user computing device 102 can implement multiple parallel instances of a single image segmentation model 120 (e.g., to perform parallel image segmentation across multiple instances of users using a virtual background feature in a video conference session).

More particularly, the machine-learned image segmentation model can be trained and configured to process image data to generate segmentation data, which can then be utilized for the generation of augmentation data. For example, a user may be using a video conferencing web service but does not want to include their background in the uploaded video stream. The user can select a user interface element of the video conferencing website to request a virtual background feature. The machine-learned image segmentation model can then be utilized to generate one or more segmentation masks associated with the silhouette of the user. The one or more segmentation masks, the image data, and virtual background data can then be utilized to generate augmented image data which can be descriptive of the user in a new environment (e.g., a beach, a virtual office space, etc.).

Additionally or alternatively, one or more image segmentation models 140 can be included in or otherwise stored and implemented by the server computing system 130 that communicates with the user computing device 102 according to a client-server relationship. For example, the image segmentation models 140 can be implemented by the server computing system 140 as a portion of a web service (e.g., an image segmentation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned image segmentation models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5 & 9-10.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the image segmentation models 120 and/or 140 based on a set of training data 162. The training data 162 can include, for example, training image data. In some implementations, the training data 162 can include ground truth annotations, ground truth masks, and/or one or more labels.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the segmentation model can be utilized for other forms of data outside of image data alone.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be statistical data. The machine-learned model(s) can process the statistical data to generate an output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
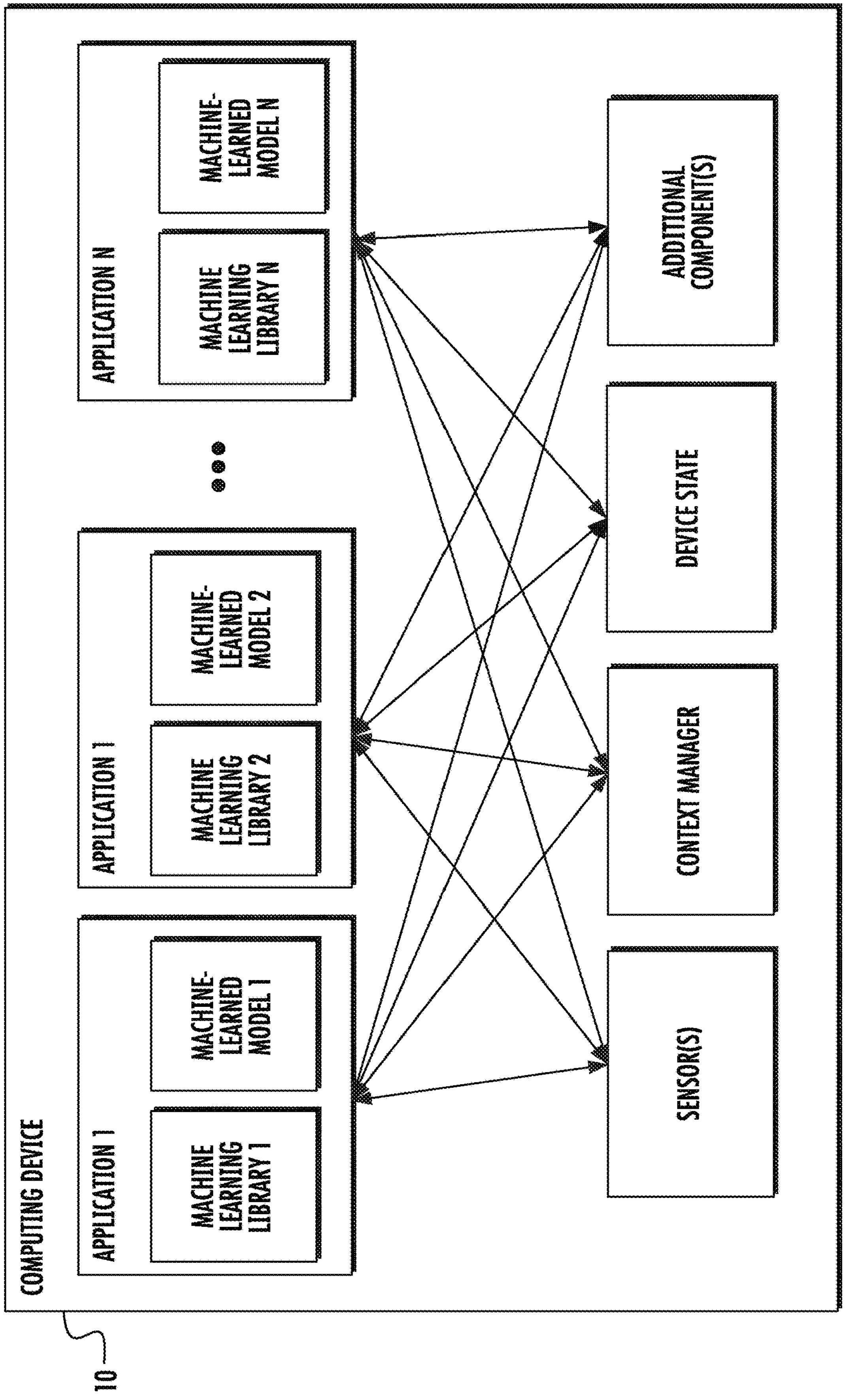
FIG. 1B depicts a block diagram of an example computing device that performs image segmenting according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
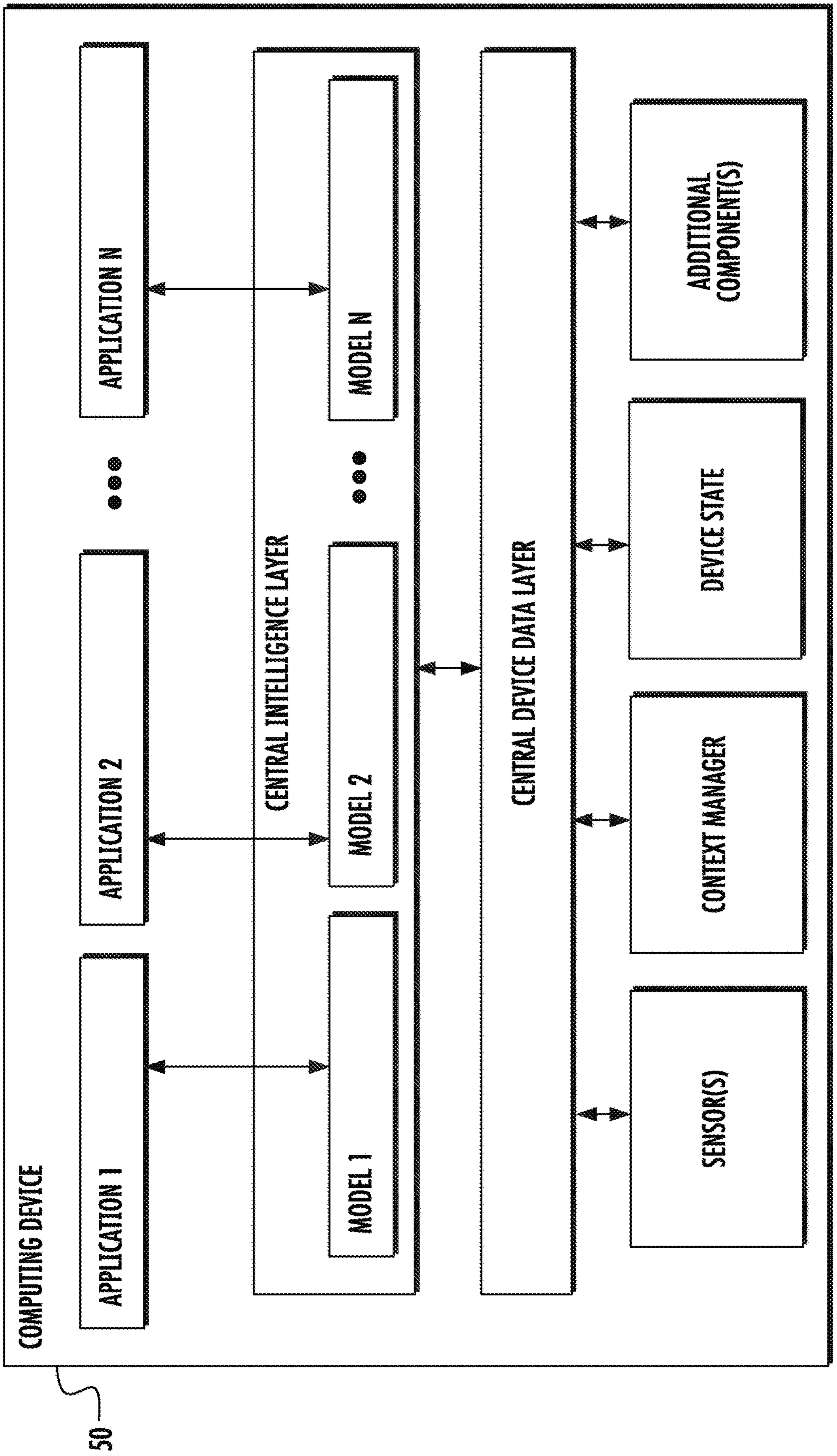
FIG. 1C depicts a block diagram of an example computing device that performs image segmenting according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 9:
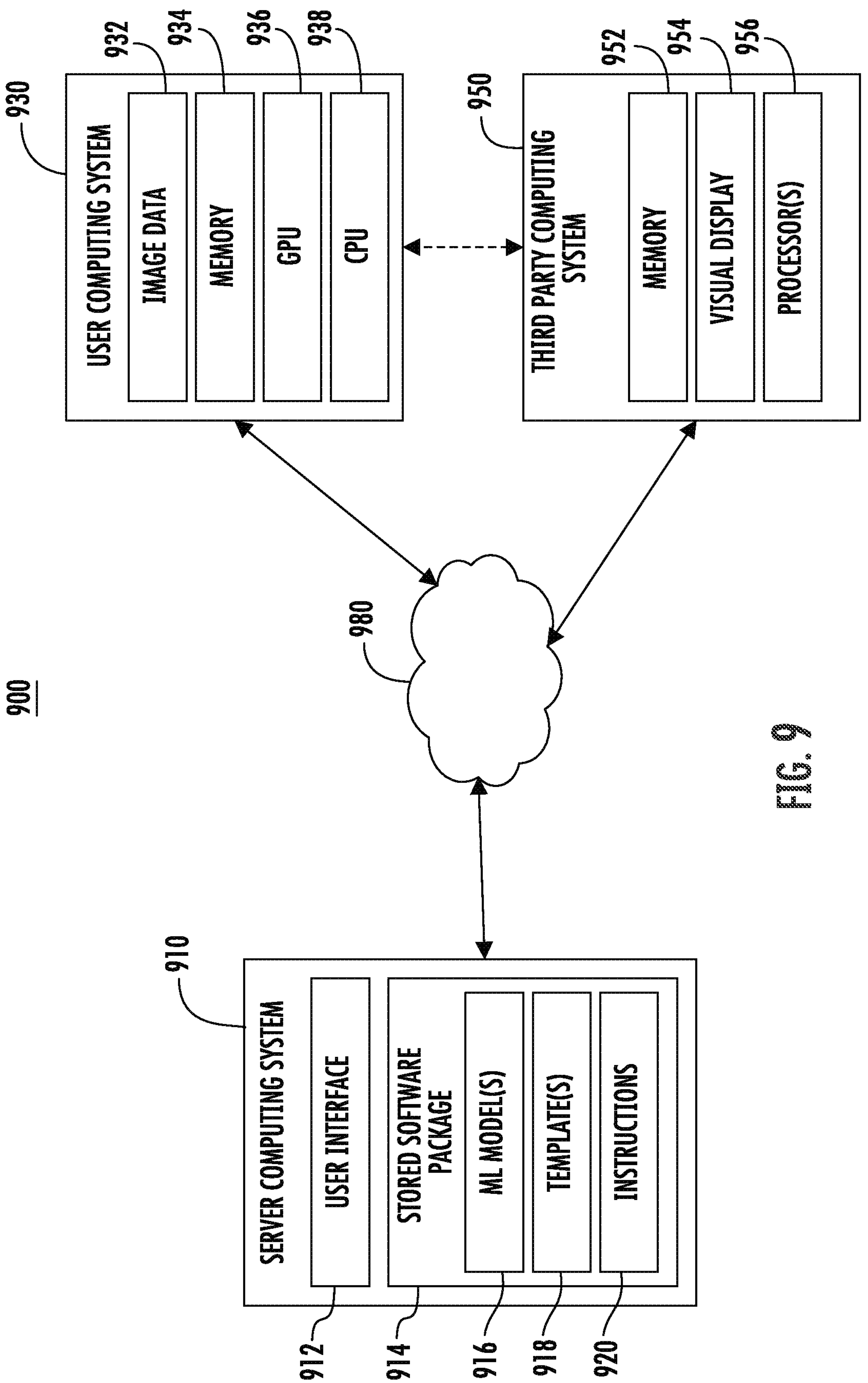
FIG. 9 depicts a block diagram of an example computing system according to example embodiments of the present disclosure.

FIG. 9 depicts a block diagram of an example computing system according to example embodiments of the present disclosure. For example, the systems and methods disclosed herein can include a server computing system 910, a user computing system 930, and one or more third party computing systems 950 communicatively connected via a network 980 (e.g., wired or wirelessly).

The server computing system 910 can include data associated with a user interface 912 that can be provided to the user computing system 930 and/or the third party computing system 950 for obtaining one or more interactions from one or more users. The user interface 912 can include one or more user interface elements for providing information for display and/or for receiving inputs from a user to initiate one or more features of a web application.

In some implementations, the server computing system 910 can include one or more stored software packages 914. The one or more stored software packages 914 can be transmitted to a user computing system 930 in response to a request obtained via a user interaction with the user interface 912. The stored software package 914 can include one or more machine-learned models 916 (e.g., an image segmentation model and/or a rendering model). Additionally and/or alternatively, the stored software package 914 can include one or more templates 918 (e.g., one or more virtual backgrounds). In some implementations, the stored software package 914 can include instructions 920 for utilizing the one or more machine-learned models 916 to generate augmented image data.

The user computing system 930 can include image data 932 which can be stored and/or generated on the user computing system 930 for use in a video conference session. In some implementations, the user computing system 930 can include memory 934 for storing system data, user data, application data, and/or instructions for executing one or more operations. Additionally and/or alternatively, the user computing system 930 can include one or more processors. For example, the user computing system 930 can include a GPU 936 and a CPU 938. In some implementations, the systems and methods disclosed herein can be configured to implement the use of an image segmentation model of the stored software package 914 in the web browser of the user computing system 930 using the user computing system's 930 GPU 936.

The third party computing system 950 can include memory 952, a visual display 954, and/or one or more processors 956. The memory 952 can include stored data and stored instructions for executing one or more operations. The visual display 954 can be configured to display the augmented image data generated by the user computing system 930. In some implementations, the augmented image data may be sent over the network 980. Alternatively and/or additionally, the augmented image data may be sent to the third party computing system 950 via a closed network.

Example Model Arrangements

Figure 2:
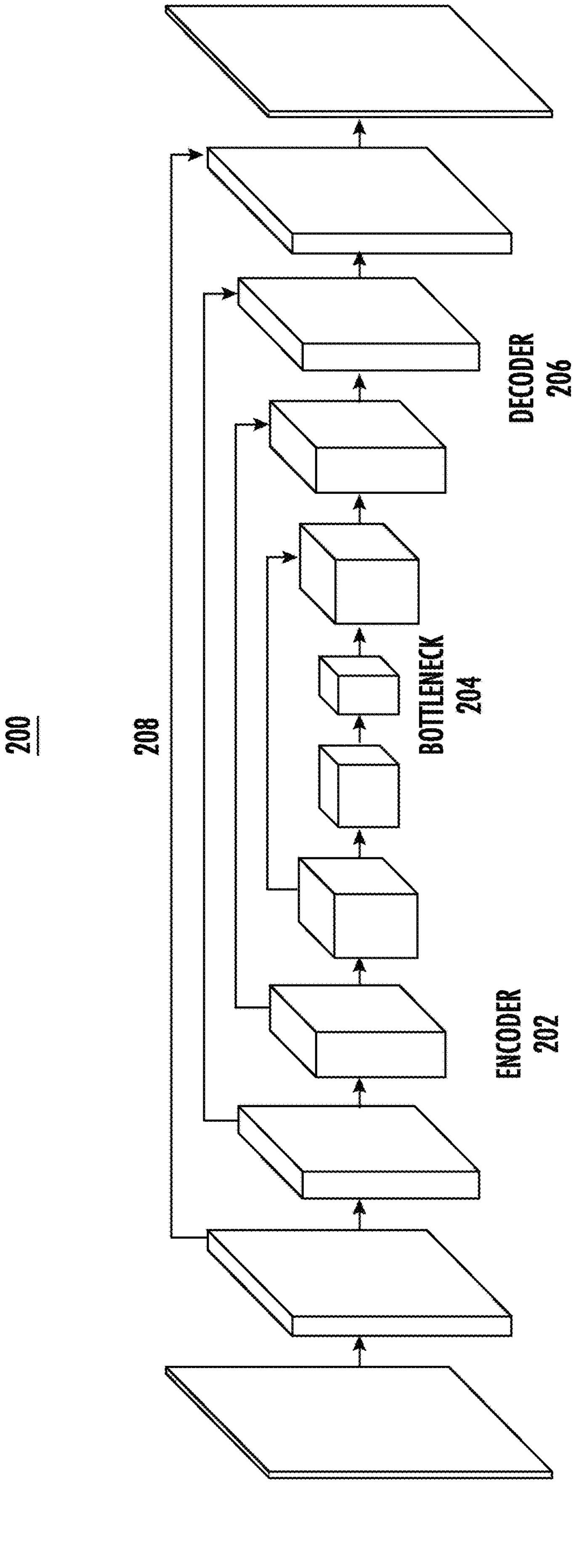
FIG. 2 depicts a block diagram of an example image segmentation model according to example embodiments of the present disclosure.

FIG. 2 depicts a block diagram of an example machine-learned image segmentation model 200 according to example embodiments of the present disclosure. In some implementations, the machine-learned image segmentation model 200 is trained to receive a set of input data descriptive of one or more image frames including an object in an environment and, as a result of receipt of the input data, provide output data that is descriptive of the object in a new artificial environment. Thus, in some implementations, the machine-learned image segmentation model 200 can include a bottleneck model 202 that is operable to output coarse predictions at a fraction of the input resolution.

FIG. 2 can depict a block diagram of an example image segmentation model according to example embodiments of the present disclosure. As displayed in FIG. 2, the encoder model 202 can extract features at five levels: ½, ¼, ⅛, 1/16, and 1/32 of the input resolution.

In particular, the example machine-learned image segmentation model 200 can include an encoder model 202, a bottleneck model 204, and a decoder model 206. The encoder model 202 can include a plurality of inverted residual blocks. In some implementations, the encoder model can include one or more encoder blocks (e.g., one or more conv2D blocks, one or more ReLu6 activation blocks, and/or one or more depthwiseconv2D blocks). In some implementations, the bottleneck model 204 can include one or more bottleneck blocks (e.g., one or more global pooling blocks, one or more conv2D blocks, one or more ReLu6 activation blocks, and/or one or more sigmoid blocks). Additionally and/or alternatively, the decoder model 206 can include one or more decoder blocks (e.g., one or more fine blocks, one or more coarse blocks, one or more upsample blocks, one or more concatenation blocks, one or more conv2D blocks, and/or one or more ReLu6 activation blocks). In some implementations, the decoder model 206 can include one or more multilayer perceptrons.

The encoder model 202 can be configured to intake input data (e.g., image data) to generate encoder data (e.g., encoded image data). In some implementations, the bottleneck model 204 can be configured to intake encoder data to generate bottleneck data. The decoder model 206 can be configured to intake bottleneck data to generate output data. In some implementations, the output data can include augmented image data.

Figure 3:
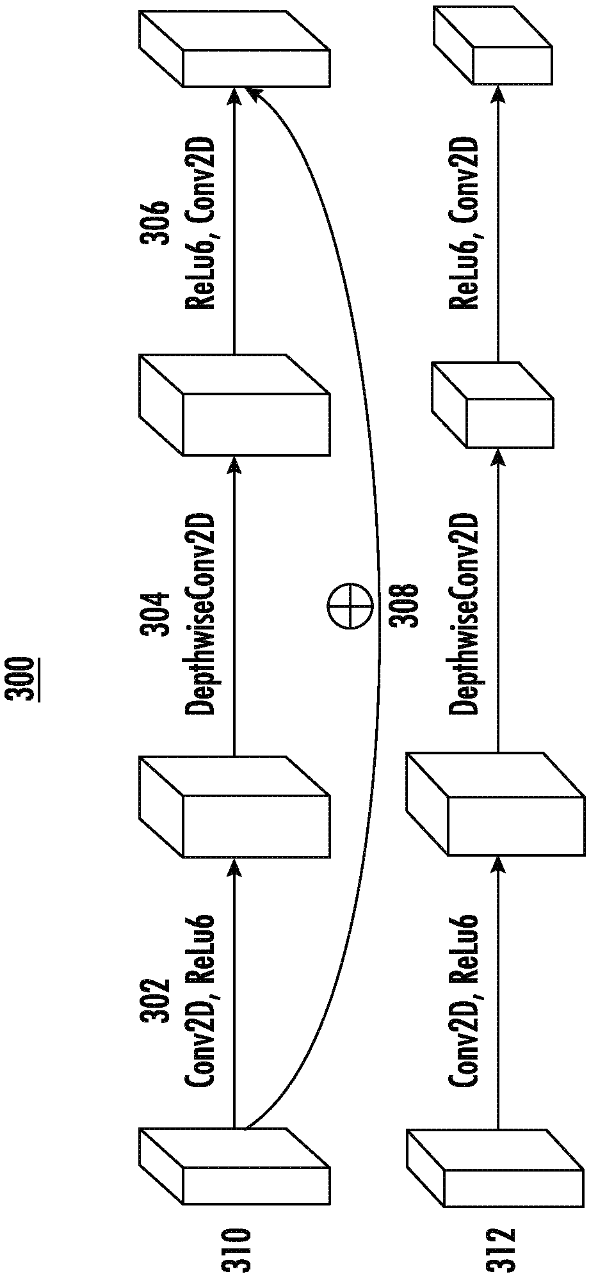
FIG. 3 depicts a block diagram of an example encoder model according to example embodiments of the present disclosure.

FIG. 3 depicts a block diagram of an example encoder model 300 according to example embodiments of the present disclosure. As conveyed in FIG. 3, the input tensor can be expanded in channel, passed to a depthwise convolution, and then compressed to the original channel size. The top encoder 310 depicts an example encoder with a residual connection 308. The bottom encoder 312 depicts an example encoder without a residual connection 308.

Both the top encoder 310 and the bottom encoder 312 can include a channel expansion block 302, a depthwise convolution block 304, and a channel compression block 306. Alternatively and/or additionally, the depthwise convolution block 304 may be replaced with a group convolution block based on the hardware being utilized. The bottom encoder 312 without the residual connection 308 may be utilized over the top encoder 310 with the residual connection 308 when the depthwise convolution has a stride for downscaling the tensor.

The encoder model 300 can include one or more convolutional neural networks (e.g., MobileNets or EfficientNets). For example, the channel expansion block 302 and the channel compression block 306 may both include 2D convolutions and a ReLu activation. Additionally and/or alternatively, the depthwise convolution block 304 can include one or more 2D depthwise convolutional layers.

Figure 4:
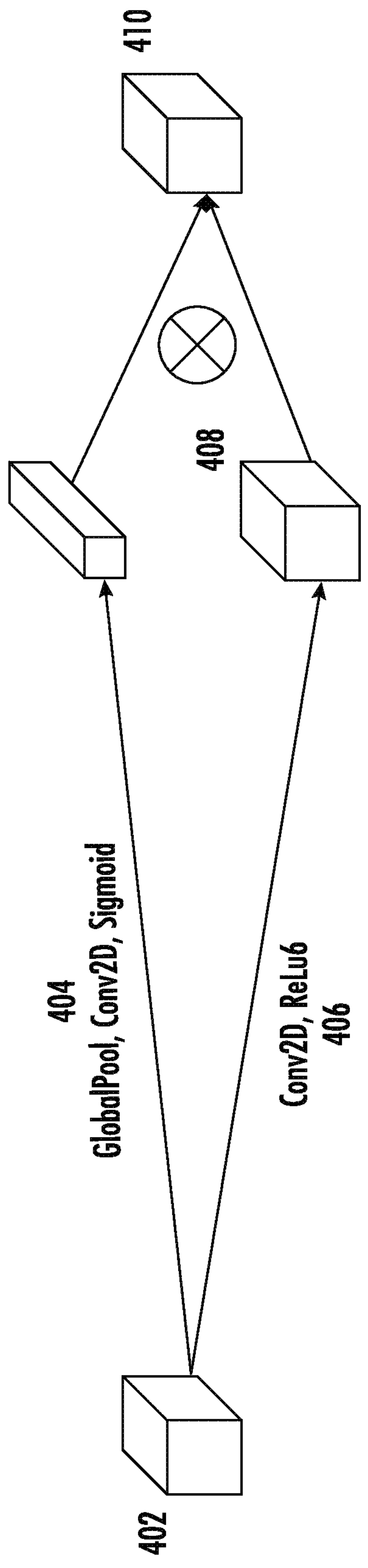
FIG. 4 depicts a block diagram of an example bottleneck model according to example embodiments of the present disclosure.

FIG. 4 depicts a block diagram of an example bottleneck model 400 according to example embodiments of the present disclosure. The bottleneck model 400 can intake an encoder output 402 from the encoder model 300 and can output a bottleneck output 410 to be processed by the decoder model 500.

In particular, the bottleneck model 400 can include a global pooling block 404, a convolution block 406, and a bottleneck concatenation block 408. The global pooling block 404 can include one or more global pooling layers, one or more 2D convolutions, and one or more sigmoid layers. In some implementations, the convolution block 406 can include one or more 2D convolutions and a ReLu activation.

The output of the global pooling block 404 and the output of the convolution block 406 can be concatenated by the bottleneck concatenation block 408 to generate the bottleneck output 410.

The bottleneck model 400 can output coarse predictions at 1/32 of the input resolution. In some implementations, the bottleneck model 400 can multiply a channel-wise attention to the prediction, obtained by a global average pooling with sigmoid activation. The prediction can be refined by the decoder with skip connections of features from the encoder.

Figure 5:
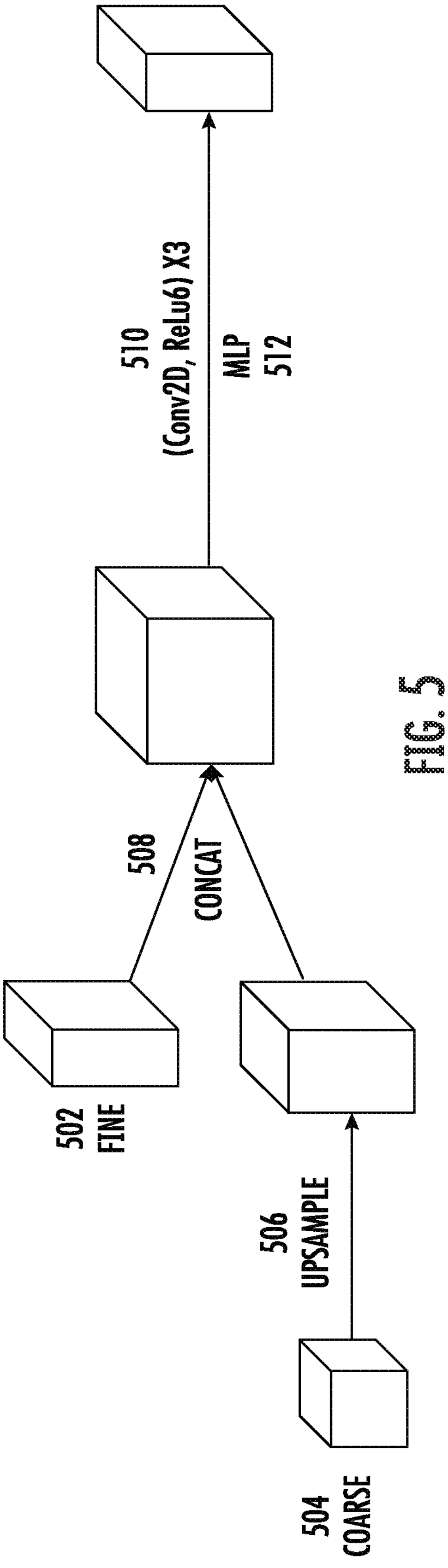
FIG. 5 depicts a block diagram of an example decoder model according to example embodiments of the present disclosure.

FIG. 5 depicts a block diagram of an example decoder model 500 according to example embodiments of the present disclosure. The decoder block 500 can include one or more multilayer perceptrons. In some implementations, the decoder model 500 can include an upsample block 506 and a decoder concatenation block 508.

Processing with the decoder model 500 can include a coarse prediction 504 being processed by the upsample block 506 to generate an upsampled output that can then be concatenated with a fine prediction 502 using the decoder concatenation block 508. The concatenation output can then be processed by the multilayer perceptron 512 to generate the decoder output. In some implementations, the concatenation output can be processed by one or more 2D convolution layers (e.g., three convolutional blocks) and one or more ReLu activation layers (e.g., three ReLu activation layers).

Figure 10:
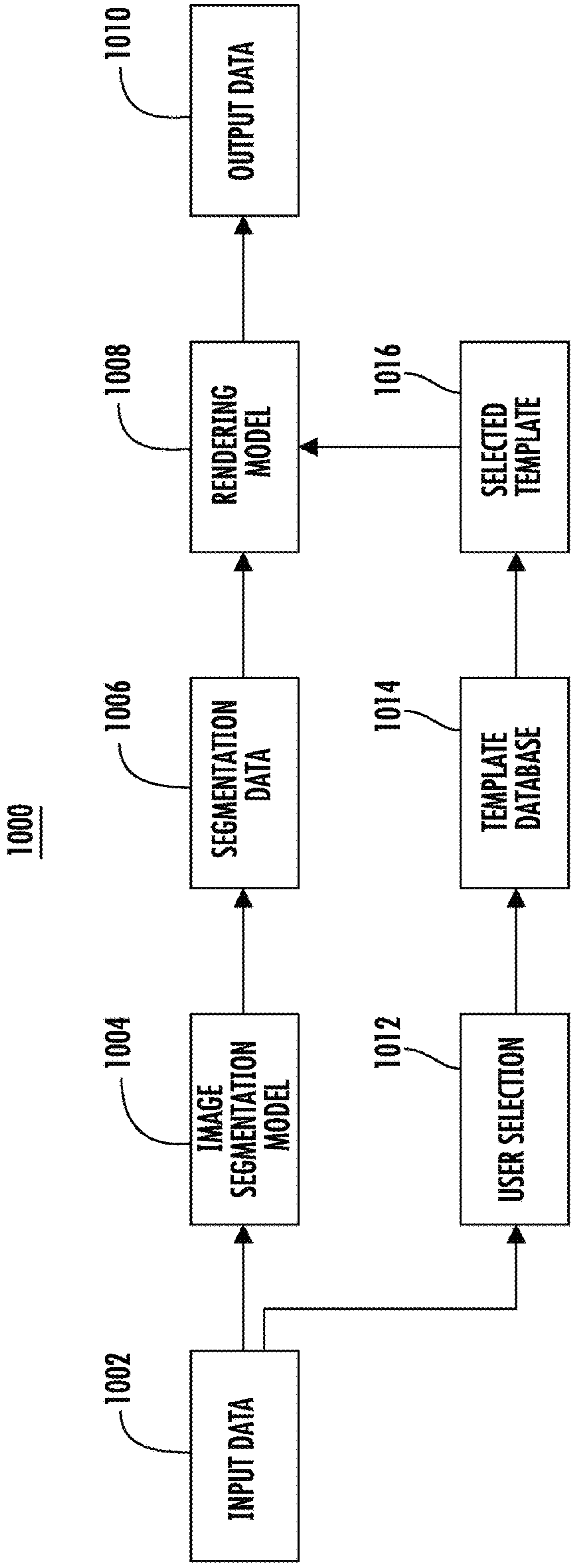
FIG. 10 depicts a block diagram of an example image augmentation system according to example embodiments of the present disclosure.

FIG. 10 depicts a block diagram of an example machine-learned image segmentation model system 1000 with a machine-learned image segmentation model 1004 according to example embodiments of the present disclosure. The machine-learned image segmentation model 1004 is similar to the machine-learned image segmentation model 200 of FIG. 2 except that the machine-learned image segmentation model system 1000 further includes a rendering model 1008 for rendering the augmented images of the output data 1010.

The process can begin with at least a portion of the input data 1002 being processed by the image segmentation model 1004 to generate segmentation data 1006. The data being processed can include image data generated by one or more image sensors. Additionally and/or alternatively, the image segmentation model 1004 can be obtained from a server computing system for localized processing on the user computing device using the GPU as initiated in the web browser. In some implementations, the segmentation data 1006 can include one or more segmentation masks associated with objects in the foreground of an environment being depicted in the image data (e.g., a human body of the user in a video conferencing session).

Additionally, FIG. 10 can depict an example image segmentation system that utilizes a template 1016 (e.g., a template virtual background) for generating the output data 1010. In particular, the user can make a selection in the user interface to indicate a desired template. The user selection 1012 can be part of the input data 1002 received by the system. The user selection 1012 can be utilized to determine a particular template in the template database 1014 to use. In some implementations, the selected template 1016 can be determined based on the selection being associated with the selected template 1016 and/or may be selected based on one or more keywords or a determined semantic intent.

The segmentation data 1006 and the selected template 1016 can then be processed by a rendering model 1008 to generate output data 1010. The output data 1010 can include augmented image data which can be descriptive of the one or more objects in the foreground of the environment rendered with the selected template 1016. For example, the object can include the user, and the selected template 1016 can include a virtual beach background. Therefore, the output data 1010 can be descriptive of the user in the virtual beach environment.

In some implementations, the templates in the template database 1014 can include one or more static images, one or more videos, and/or one or more animated images. The template database 1014 can include the media library of the user stored locally or stored on a server. Alternatively and/or additionally, the template database 1014 may be obtained and/or stored on a server computing system associated with the video conferencing web service.

Example Methods

Figure 6:
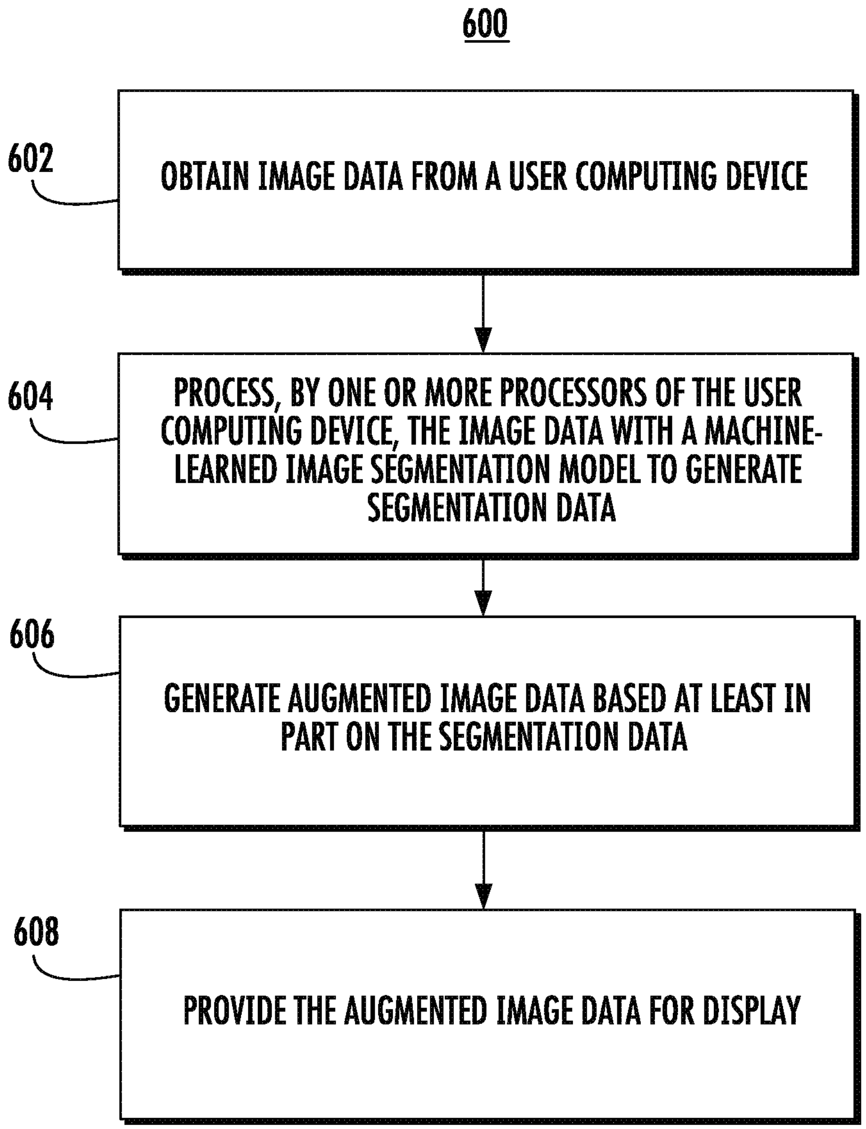
FIG. 6 depicts a flow chart diagram of an example method to perform image segmenting according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain image data from a user computing device. The image data can be obtained from a user computing device. In some implementations, the image data can be descriptive of one or more image frames. The image data can include an object (e.g., a human, a dog, a product, or a structure). In some implementations, the image data can be captured by a camera (e.g., a webcam) associated with the user computing device.

Additionally and/or alternatively, the image data can be obtained as part of a video conference service. For example, the image data can include a plurality of image frames associated with a video stream. In some implementations, the object can include at least a portion of a human. For example, the object can include a user's head and a portion of their torso.

At 604, the computing system can process, by one or more processors of the user computing device, the image data with a machine-learned image segmentation model to generate segmentation data. In some implementations, the segmentation data can include a segmentation mask associated with the object in the foreground. For example, the segmentation data can be descriptive of a segmentation mask masking the object. The segmentation mask can be descriptive of a plurality of pixels associated with a human.

In some implementations, the segmentation task can be a foreground/background segmentation. For example, the segmentation data can include an output segmentation mask of the foreground. Alternatively and/or additionally, the segmentation data may include an output segmentation mask of the background.

At 606, the computing system can generate augmented image data based at least in part on the segmentation data. The augmented image data can be descriptive of the object with an artificial background. For example, the augmented image data can be descriptive of a user with a virtual background.

At 608, the computing system can provide the augmented image data for display. The augmented image data can be provided for display on the user computing device. Additionally and/or alternatively, the augmented image data can be provided on a third party computing device separate from the user computing device and the server computing device. In some implementations, the augmented image data may be sent directly to the third party computing device from the user computing device over a network. For example, the computing system can send the augmented image data to a second user computing device associated with a second user. In some implementations, the augmented image data may be provided in a user interface of a video conferencing web platform.

In some implementations, the computing system can implement a video conferencing web application. The video web conference application can facilitate and/or enable one or more of 602, 604, 606, or 608. Additionally and/or alternatively, the video web conference application may be accessed via a web browser application, which can allow the use of the one or more processors of the user computing device via the use of a web browser application programming interface (e.g., WebGL or WebGPU). In some implementations, the video conference web application can allow for real time augmented image data generation inside a web browser.

Figure 7:
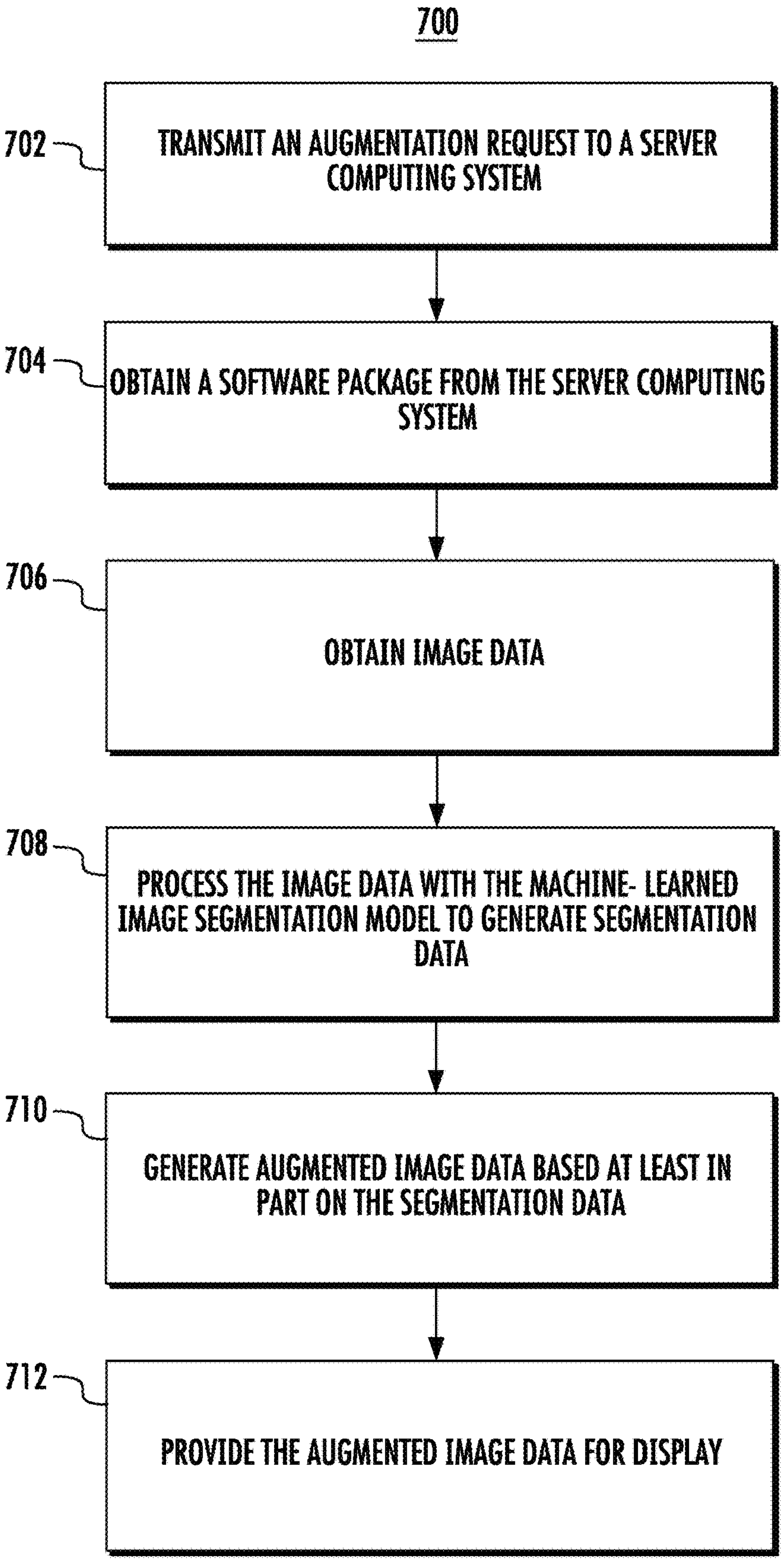
FIG. 7 depicts a flow chart diagram of an example method to perform image segmenting according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can transmit an augmentation request to a server computing system. In some implementations, the augmentation request can be associated with a web application (e.g., a video conferencing web application).

At 704, the computing system can obtain a software package from the server computing system. The software package may be obtained from a server computing system associated with the web application. In some implementations, the software package can include a machine-learned image segmentation model. Additionally and/or alternatively, the software package can include one or more templates for virtual backgrounds (e.g., a virtual beach, a virtual office space, etc.).

At 706, the computing system can obtain image data. The image data can be obtained with a camera connected to a user computing device. In some implementations, the image data can include an object. The object can be an animal, a product (e.g., a product being advertised), a structure, a plant, or an object in nature. In some implementations, the image data can include a plurality of objects for segmenting.

At 708, the computing system can process the image data with the machine-learned image segmentation model to generate segmentation data. The segmentation data can include one or more segmentation masks associated with the one or more objects. In some implementations, processing the image data with the machine-learned image segmentation model to generate the segmentation data can include processing utilizing the graphics processing unit of a user computing device of the user computing system. Alternatively and/or additionally, processing the image data with the machine-learned image segmentation model to generate the segmentation data can include accessing the one or more processors via a web browser.

At 710, the computing system can generate augmented image data based at least in part on the segmentation data. The augmented image data can include the object in an environment different than an original environment depicted in the image data. For example, the augmented image data may be descriptive of the object with a virtual background.

At 712, the computing system can provide the augmented image data for display. In some implementations, the augmented image data may be provided on the user computing device. Alternatively and/or additionally, the augmented image data may be provided for display on a third party computing device in response to the user computing device transmitting the augmented image data to the third party computing device.

In some implementations, the software package can be stored by the user computing system for future instances of video conferencing. The software package may be stored in connection with the user's preferred web browser application. In some implementations, the storage of the software package can involve encryption of the software package.

Figure 8:
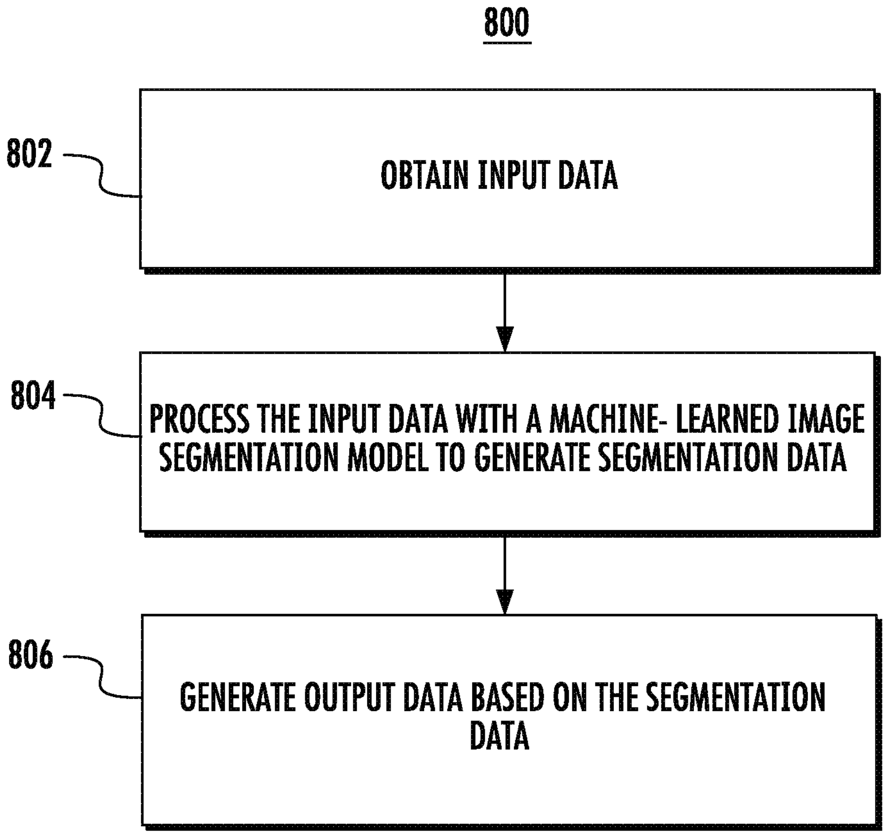
FIG. 8 depicts a flow chart diagram of an example method to perform image segmenting according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain input data. The input data can include image data associated with a user. The image data can include an object (e.g., a human, another animal, a building, a furniture item, an electronic device, a sign, a poster, a vehicle, etc.) in a scene (e.g., a room, a park, a road, an alley, etc.).

At 804, the computing system can process the input data with a machine-learned image segmentation model to generate segmentation data. The machine-learned image segmentation model may be obtained from a server computing system. The machine-learned image segmentation model may be downloaded in response to the user computing device accessing a video conferencing web platform.

In some implementations, the machine-learned image segmentation model can be stored in a server computing system communicatively connected to one or more user computing devices. The one or more user computing devices can include a first user computing device associated with the input data and a second user computing device associated with a third party user. The first user computing device and the second user computing device can be communicatively connected via the video conferencing web platform.

The machine-learned image segmentation model can include one or more encoder blocks, one or more bottleneck blocks, and one or more decoder blocks. In some implementations, the machine-learned image segmentation model can include a MobileNetV3 model. Alternatively and/or additionally, the machine-learned image segmentation model can include a U-Net structure.

At 806, the computing system can generate output data based on the segmentation data. In some implementations, the output data can include augmented image data. The augmented image data can be descriptive of the object (e.g., the human, the plant, the building, or a product) without the scene (e.g., the room, the road, the alley, etc.).

Figure 11:
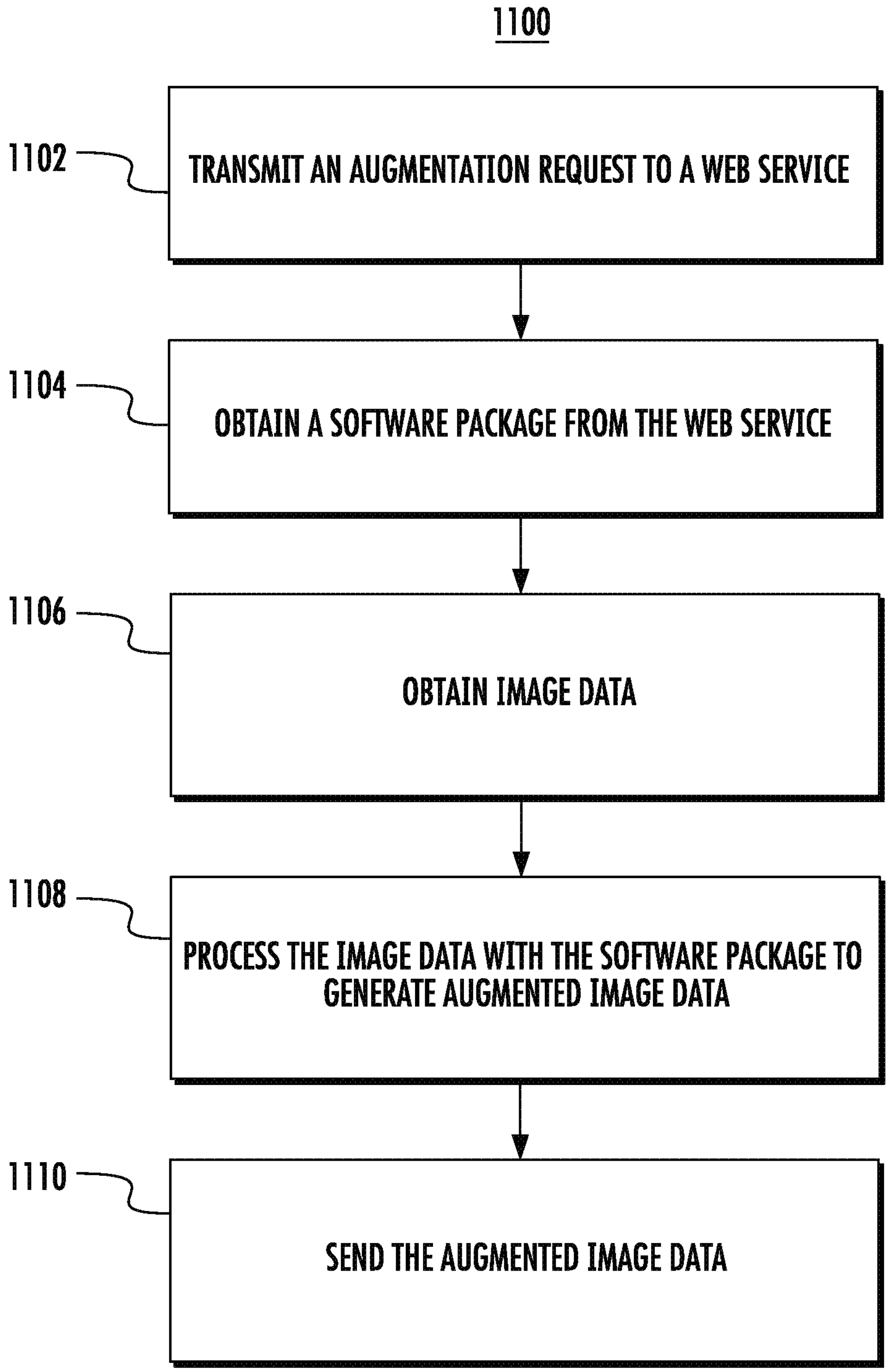
FIG. 11 depicts a flow chart diagram of an example method to perform image augmentation for video conferencing according to example embodiments of the present disclosure.

FIG. 11 depicts a flow chart diagram of an example method to perform according to example embodiments of the present disclosure. Although FIG. 11 depicts steps performed in a particular order for purposes of illustration and discussion, the methods of the present disclosure are not limited to the particularly illustrated order or arrangement. The various steps of the method 1100 can be omitted, rearranged, combined, and/or adapted in various ways without deviating from the scope of the present disclosure.

At 1102, a computing system can transmit an augmentation request to a web service. The augmentation request can be transmitted in response to the user computing device accessing a video conferencing web service. The video conferencing web service may be provided via a web browser. In some implementations, the augmentation request can be associated with a web application.

At 1104, the computing system can obtain a software package from the web service. The software package can include a machine-learned image segmentation model, instructions (e.g., instructions for segmenting a foreground from a background and adding a virtual background), and one or more template virtual backgrounds. In some implementations, the software package can be a lightweight software package limited to only software needed for image augmentation in the web browser.

At 1106, the computing system can obtain image data. The image data may be obtained from a camera associated with the user computing device. The image data can include an object (e.g., at least a portion of the user's body) in the foreground. The image data can include data associated with one or more image frames of a video stream for video conference upload.

At 1108, the computing system can process the image data with the software package to generate augmented image data. The augmented image data can be descriptive of the object with a virtual background (e.g., a portion of the user's body with a virtual background). In some implementations, processing the image data with a software package can include processing the image data with a machine-learned image segmentation model to generate segmentation data. The segmentation data can include one or more segmentation masks associated with the foreground (e.g., the object in the foreground). The segmentation data and a template virtual background can then be utilized to generate the augmented image data.

At 1110, the computing system can send the augmented image data. The augmented image data can be sent to a second user in a video conference session with the first user. In some implementations, the augmented image data may be uploaded to a server computing system, then sent to a second user computing device. Alternatively and/or additionally, the augmented image data may be sent directly to the second user computing device via a network.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for web-based video segmentation, the system comprising:

one or more processors; and one or more non-transitory computer-readable media that collectively store instructions that, when executed by the one or more processors, cause the computing system to perform operations, the operations comprising:

obtaining image data from a user computing device, wherein the image data comprises an object;

implementing, by one or more processors of the user computing device, a video conferencing web application, wherein implementing the video conferencing web application comprises:

obtaining and storing, on the user computing device, a software package comprising a machine-learned image segmentation model from a server computing system;

processing, by the one or more processors of the user computing device, the image data with the machine-learned image segmentation model to generate segmentation data;

generating augmented image data based at least in part on the segmentation data;

providing the augmented image data for display;

accessing, by the user computing device, a web page associated with the video conferencing web application;

obtaining, by the user computing device, additional image data;

processing, by the user computing device, the additional image data with the machine-learned image segmentation model to generate additional segmentation data; and generating, by the user computing device, additional augmented image data based at least in part on the additional segmentation data.

2. The system of claim 1, the operations further comprise:

transmitting a request to utilize an image augmentation service associated with the video conferencing web application; and obtaining the software package from a server computing system based on the request.

3. The system of claim 1, wherein the image data comprises a video associated with a video conference call, wherein each frame of the video is processed by the machine-learned image segmentation model to generate a plurality of segmentation masks, and wherein the augmented image data comprises an augmented video generated based on the plurality of segmentation masks.

4. The system of claim 1, wherein the operations further comprise:

sending the augmented image data to a second user computing device associated with a second user.

5. The system of claim 1, wherein the segmentation data comprises a segmentation mask associated with the object.

6. The system of claim 5, wherein the segmentation mask is descriptive of a plurality of pixels associated with a human, wherein the object comprises a human.

7. The system of claim 1, wherein the augmented image data is descriptive of the object with an artificial background.

8. The system of claim 1, wherein the image data is captured by a webcam associated with the user computing device.

9. The system of claim 1, wherein the object comprises at least a portion of a human.

10. The system of claim 1, wherein the image data is obtained as part of a video conference service provided by the video conferencing web application, wherein the video conference service comprises:

sending the augmented image data to a second user computing device;

receiving second user image data from the second user computing device; and providing the second user image data for display.

11. A computer-implemented method for web-based video segmentation, the method comprising:

transmitting, by a user computing system comprising one or more processors, an augmentation request to a server computing system, wherein the augmentation request is associated with a web application;

obtaining, by the user computing system, a software package from the server computing system, wherein the software package comprises a machine-learned image segmentation model;

obtaining, by the user computing system, image data, wherein the image data comprises an object;

processing, by the user computing system, the image data with the machine-learned image segmentation model to generate segmentation data;

generating, by the user computing system, augmented image data based at least in part on the segmentation data;

providing, by the user computing system, the augmented image data for display;

storing, by the user computing system, the software package;

accessing, by the user computing system, a web page associated with the web application;

obtaining, by the user computing system, additional image data;

processing, by the user computing system, the additional image data with the machine-learned image segmentation model to generate additional segmentation data;

generating, by the user computing system, additional augmented image data based at least in part on the additional segmentation data.

12. The method of claim 11, wherein processing, by the user computing system, the image data with the machine-learned image segmentation model to generate the segmentation data comprises processing utilizing a graphics processing unit of a user computing device of the user computing system.

13. The method of claim 11, wherein processing, by the user computing system, the image data with the machine-learned image segmentation model to generate the segmentation data comprises accessing the one or more processors via a web browser application programming interface.

14. One or more non-transitory computer-readable media that collectively store instructions that, when executed by one or more computing devices, cause the one or more computing devices to perform operations, the operations comprising:

obtaining input data, wherein the input data comprises image data associated with a user, and wherein the image data comprises an object in a scene;

processing the input data with a machine-learned image segmentation model to generate segmentation data, wherein the machine-learned image segmentation model comprises:

one or more encoder blocks, wherein the one or more encoder blocks are configured to process the image data to generate an encoder output, and wherein the one or more encoder blocks comprise:

a channel expansion block;

a depthwise convolution block; and a channel compression block;

one or more bottleneck blocks, wherein the one or more bottleneck blocks are configured to process the encoder output to generate a bottleneck output;

one or more decoder blocks, wherein the one or more decoder blocks are configured to process the bottleneck output to generate the segmentation data; and in response to processing the input data with the machine-learned image segmentation model, generating output data based on the segmentation data, wherein the output data comprises augmented image data, wherein the augmented image data is descriptive of the object without the scene.

15. The one or more non-transitory computer-readable media of claim 14, wherein the one or more bottleneck blocks comprise:

a global pooling block configured to process the encoder output generated by the one or more encoder blocks to generate a pooling output;

a convolution block configured to process the encoder output generated by the one or more encoder blocks to generate a convolution output; and a bottleneck concatenation block configured to concatenate the pooling output and the convolution output.

16. The one or more non-transitory computer-readable media of claim 14, wherein the one or more bottleneck blocks comprise channel-wise attention.

17. The one or more non-transitory computer-readable media of claim 15, wherein the one or more decoder blocks comprise one or more multi-layer perceptron blocks.

18. The one or more non-transitory computer-readable media of claim 14, wherein the one or more decoder blocks comprise:

an upsample block configured to upsample a coarse prediction output by the bottleneck block to generate an upsampled output; and a decoder concatenation block configured to concatenate the upsampled output and a fine feature provided via a skip connection from the one or more encoder blocks.

19. The one or more non-transitory computer-readable media of claim 14, wherein the machine-learned image segmentation model is stored in a server computing system communicatively connected to one or more user computing devices.

* * * * *